(12) United States Patent
Lai et al.

(10) Patent No.: US 6,567,263 B2
(45) Date of Patent: May 20, 2003

(54) BUILT-UP MICROCOMPUTER

(75) Inventors: Chengshing Lai, Taipei (CN); Wenyuan Huang, Nanjing (CN)

(73) Assignee: Inventec Electronics (Nanjing), Nanjing (CN)

( * ) Notice: Subject to any disclaimer, the term of this patent is extended or adjusted under 35 U.S.C. 154(b) by 107 days.

(21) Appl. No.: 09/802,740

(22) Filed: Mar. 8, 2001

(65) Prior Publication Data

US 2001/0024355 A1 Sep. 27, 2001

(30) Foreign Application Priority Data

Mar. 16, 2000 (CN) ........................................ 00219632 U

(51) Int. Cl.[7] ................................................. G06F 1/16
(52) U.S. Cl. ........................ 361/683; 361/686; 361/724
(58) Field of Search ................. 361/679–686, 361/724–727

(56) References Cited

U.S. PATENT DOCUMENTS 6,006,243 A * 12/1999 Karidis ........................ 708/100
6,282,082 B1 * 8/2001 Armitage et al. ........... 361/681

* cited by examiner

*Primary Examiner*—Darren Schuberg
*Assistant Examiner*—Yean Hsi Chang
(74) *Attorney, Agent, or Firm*—Oppenheimer, Wolff & Donnelly, LLP

(57) ABSTRACT

Present invention discloses a built-up microcomputer, comprising an input interface, output interface integrated with computer main as well as connecting part. One end of the connecting part is linked to the input interface, and the other end is hinged on a combination part. The combination part is joined to the independent output interface integrated with computer main, so that the output interface integrated with computer main is joined to the input interface. In this way, if keyboard is used as input interface, then together with output interface integrated with computer main a set of microcomputer is formed. If necessary, the output interface integrated with computer main can be separated from the combination part, so that after being completely separated from the input, the output interface can be utilized independently. Present invention can be not only folded but also disassembled, and is flexible and convenient both for operation and carrying.

9 Claims, 6 Drawing Sheets

BUILT-UP MICROCOMPUTER

BACKGROUND OF THE INVENTION

1. Field of the Invention

The present invention is related to a microcomputer, particularly to an improvement in assembling structure of a microcomputer, pertaining to the field of computer technology.

2. Description of the Related Art

Along with rapid development of science and technology as well as prevalence of Internet day by day, more and more computers are connected to Internet. Besides conventional personal computers, light-weight and small portable computer of notebook type microcomputer, E-Pad or PDA (personal digital assistant), a kind of microcomputer with connected output means, can be used for connection with internet during outgoing. The said microcomputer with connected output means is much smaller than microcomputer of notebook type, more convenient for carrying, and is capable to make input operation directly on touch screen. Operations such as e-mail, E-Commerce, E-Book, Internet-Web etc could be accomplished conveniently. But, due to the small overall dimension of present said computer, to the input means such as keyboard etc, the manufacturers usually apply fixed connection mode to form an integral set of microcomputer. Thus, the components of computer cannot be folded, and also can not be disassembled too, so that it is inconvenient in usage for people.

In view of said structural problems of conventional microcomputer, the present invention is intended to provide a folding, detachable and built-up microcomputer, so as to offer more ideal functions.

SUMMARY OF THE INVENTION

To achieve above aims, the built-up microcomputer of the present invention comprises input means, output means integrated with computer main as well as a connecting part. One end of the connecting part is linked to the input means, and the other end is hinged on a combination part. Said combination part is joined to the independent output means integrated with computer main, so that the output means integrated with computer main is joined to input means. In this way, if keyboard is used as input means, then together with output means integrated with computer main a set of microcomputer is formed. If necessary, the output means integrated with computer main can be separated from the combination part, so that after being completely separated from the input means, the output means can be utilized independently.

Since the present invention adopt the construction of hinge, it can be not only folded but also disassembled. It is flexible and convenient both for operation and carrying.

The present invention is further depicted as follows with reference to the accompanying drawings.

DETAILED DESCRIPTION OF THE INVENTION

Figure 1:
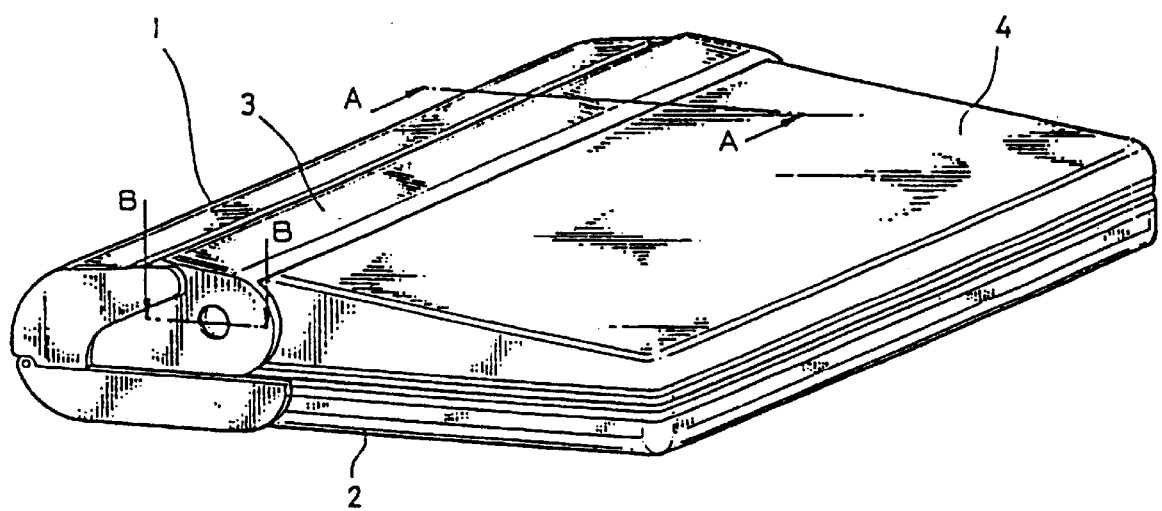
FIG. 1 is a schematic perspective view of the external appearance of an embodiment of present invention.
Figure 2:
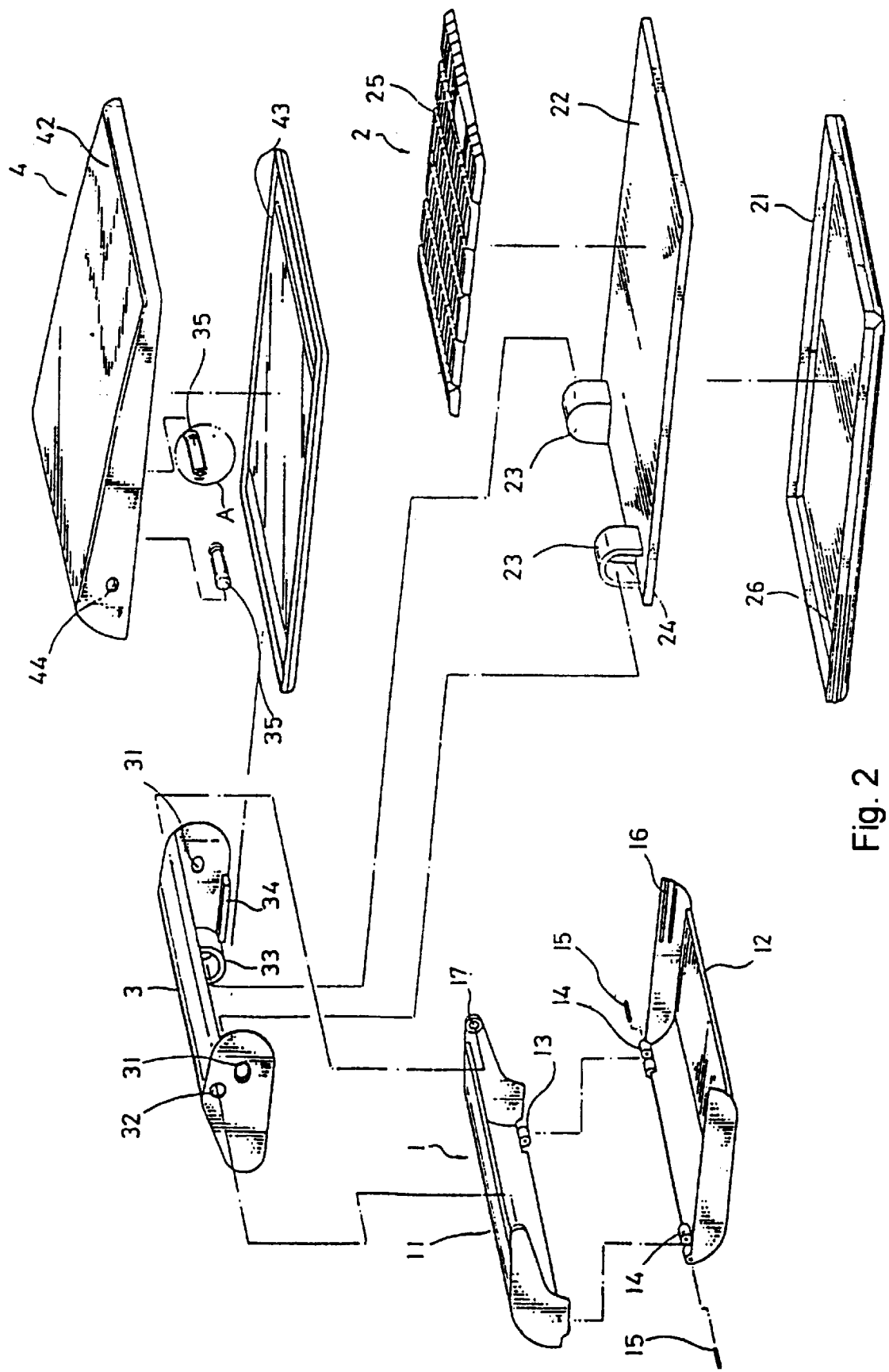
FIG. 2 is a perspective exploded view of the construction of present invention.

The built-up microcomputer in FIG. 1 comprises the input means 2 (keyboard in the present embodiment, but not limited to the keyboard in the present invention) having a front end and a back end, the output means 4 integrated with computer main (electronic notebook in the present embodiment, but not limited to the electronic notebook in the present invention) as well as the connecting part 1. One end of the connecting part is connected to the input means as shown in FIG. 2 and further described below, and another end is hinged on a combination part 3. Said combination part 3 is joined to the independent output means 4 integrated with computer main. More particularly, as shown in FIG. 2, on both sides of output means 4 integrated with computer main, the through holes 31 of combination part 3 are mounted with snap fastener 35 respectively at each corresponding position. The output means 4 integrated with computer main is provided with mating through holes 4 for snap fastener 35. When the output means 4 integrated with computer main is inserted into the combination part 3, snap fastener 35 is fitted in through holes 44, and the output means 4 integrated with computer main is joined to combination part 3, so that output means 4 integrated with computer main can be connected together with the input means 2. In case of necessity, snap fasteners 35 can be disengaged from the through holes 44, and the output means 4 integrated with computer main is separated from the combination part 3, so that the output means 4 integrated with computer main can be separated from the input means 2 completely and can be used independently.

As shown in FIG. 2, the output means 4 integrated with computer main of the present embodiment is composed of a main body 42 and a display screen 43 connected together. The input means 2 comprises a main body 21 and an outer housing 22 on top of said main body 21. At both ends of said outer housing 22 corresponding to combination part 3 are symmetrically provided lugs 23, at outer side of which is provided a cavity 24.

Furthermore, the connecting part 1 is composed respectively of an upper case 11 and a lower case 12 hinged with each other. The upper case 11 is provided with a hinge tube 13 each at both sides corresponding to the back end of the input means 2, and the lower case 12 is provided with hinge tube 14 to 12 is provided with hinge tube 14 to mate with hinge tube 13 at the corresponding position of hinge tube 13. In assembling, a pin 15 is inserted into hinge tubes 13 and 14, so that the upper case 11 and the lower case 12 are hinged together. The upper case 11 has a boss 17 provided at a position corresponding to inner end on other side of hinge tube 13. The lower case 12 is provided with a sliding track 16 at both inner sides symmetrically corresponding to the main body 21 of the input means 1, and the main body 21 is provided with mating sliding projections 26 corresponding to sliding track 16. When sliding projection 26 slides in track 16, the connecting part 1 would slide to an from on the input means 2.

In addition, the combination part 3 is provided with through hole 32 symmetrically corresponding to position of the boss 17, which is fitted movably in through hole 32, so that combination part 3 is hinged together with the connecting part 1. The combination part 3 is provided with a protruding tube 33 at both inner sides symmetrically corresponding to lug 23 of the input means 2, and said protruding tube 33 is fitted into cavity 24 of lug 23 so as to render the combination part 3 and the input means 2 hinged together. The combination part 3 is provided with positioning bars 34 symmetrically at a position corresponding to the front of display screen 43 of the output means 4 integrated with computer main. While inserting into the combination part 3, the output means 4 is slid into combination part 3 under the guide of positioning bar 34.

Figure 3:
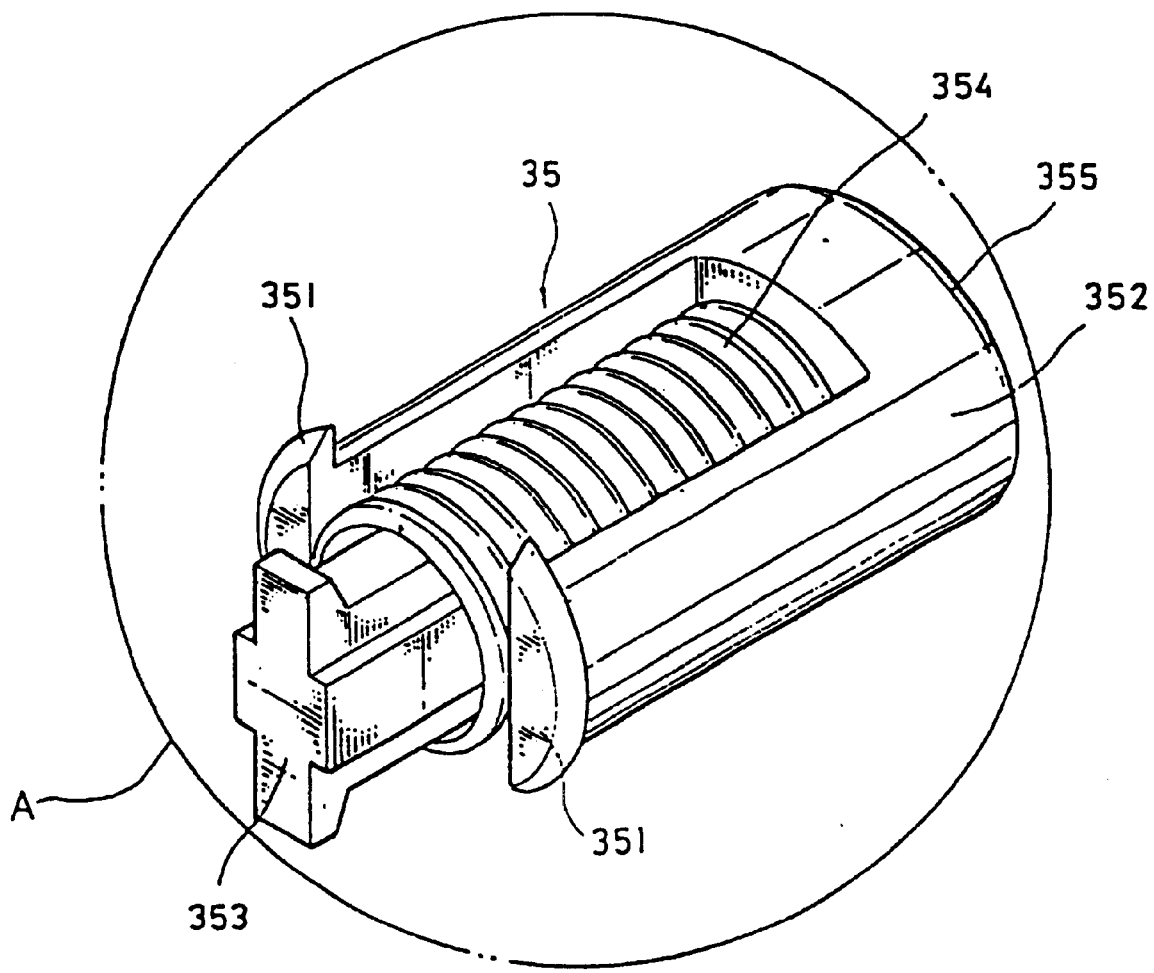
FIG. 3 is a schematic perspective view of the construction of the snap fastener in the embodiment of FIG. 1.
Figure 4:
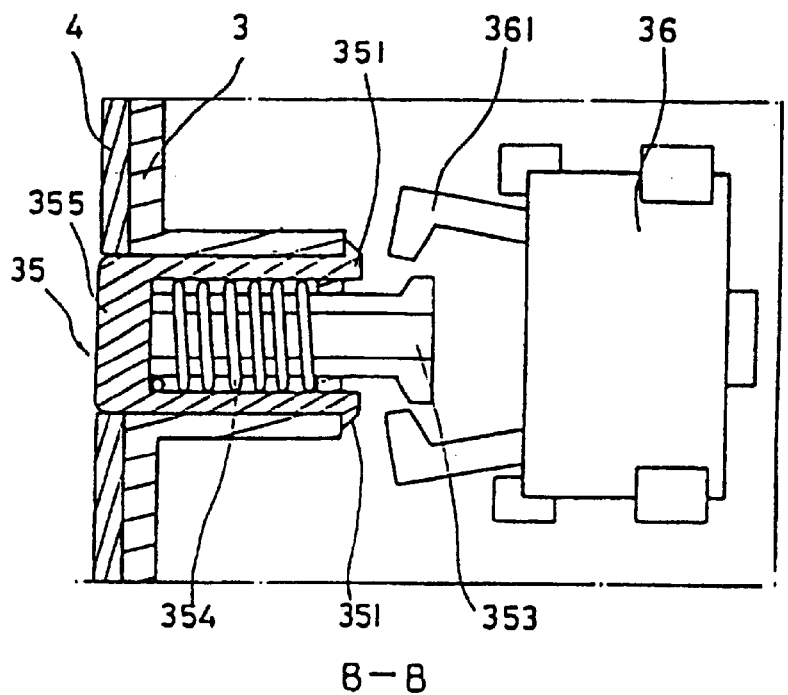
FIG. 4 is a schematic plan view of the construction of the snap fastener in the embodiment of FIG. 1.
Figure 5:
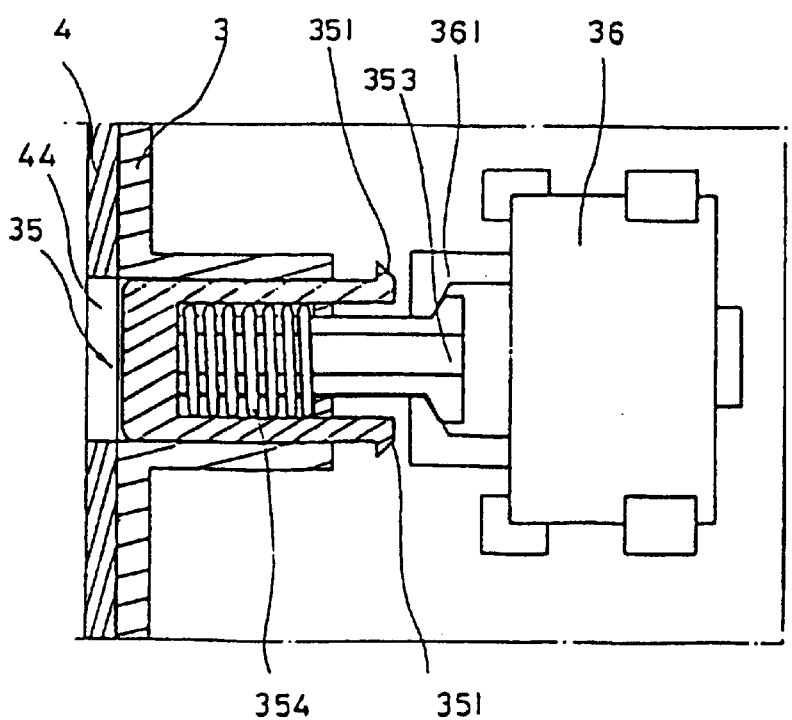
FIG. 5 is a schematic view of the action of the snap fastener in the embodiment of FIG. 1.

With reference to FIG. 3, 4 and 5, above said snap fastener 35 has a cylindrical body 352, which is provided symmetrically with shoulder 351 at both sides corresponding to end of the combination part 3. When said shoulders abut on the through hole 31, the snap fastener 35 would be confined within the combination part 3. In the cavity of snap fastener 35 is provided a mobile embedding part 353, which is surrounded by an elastic element 354 (a spring in present embodiment, but not limited to the spring in present invention). On the other end of cylindrical body 352 relative to shoulder 351 is provided a push button 355. At the position of the combination part corresponding to mobile embedding part 353 is provided a pawl member 36, which has a plurality of pawls 361 at the end relative to snap fastener 35 for catching mobile embedding part 353. When the output means 4 integrated with computer main is inserted in the combination part 3, pressing the button 355 can make pawls 361 to release the mobile embedding part 353, so that under spring action of elastic element 354, the snap fastener 35 will push the button 355 into the through hole 44. Finally the output means 4 integrated with computer main is connected with the combination part 3. Alternatively, pressing the button 355 can make the pawls 361 to catch mobile embedding part 353, and make the button 355 disengaged from the through hole 44. Finally the output means 4 integrated with computer main can be separated from the combination part 3.

Figure 6:
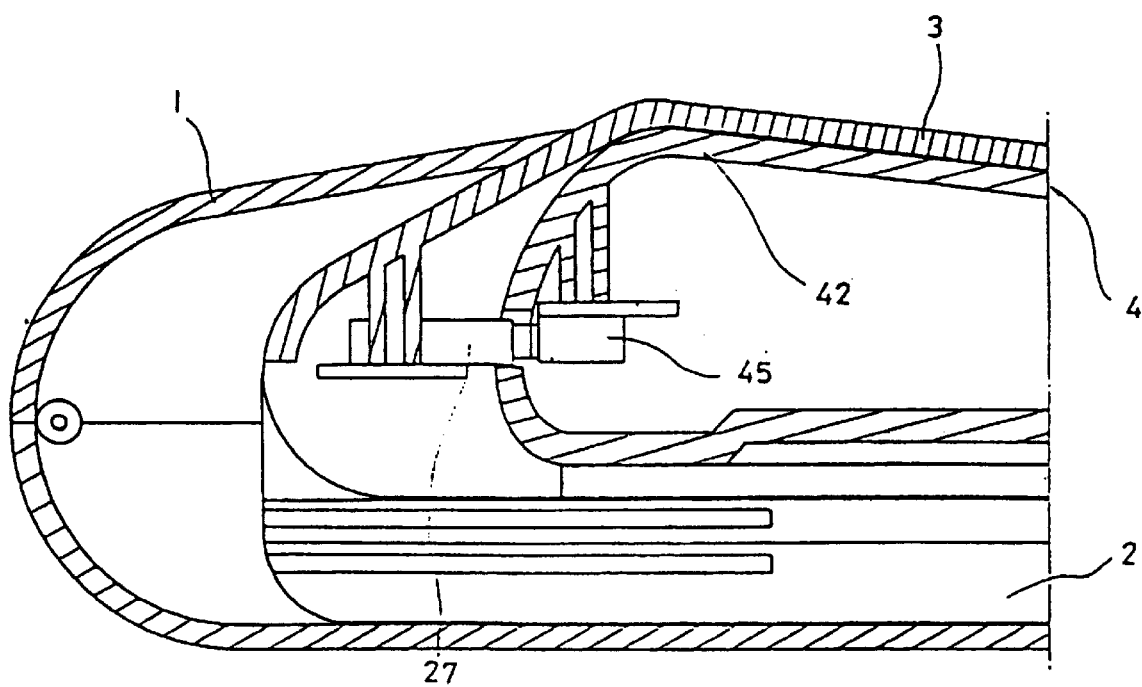
FIG. 6 is a partial sectional view of the construction in the embodiment of FIG. 1.

Referencing now to FIG. 6, in said figure body 42 of the output means 4 integrated with computer main has a connector 45 at inner side corresponding to combination part 3. Input means is connected with input terminal of electrical connector 27 set on combination part 3. When the output means 4 integrated with computer main is inserted and connected to the combination part, the connector 45 will be connected to input terminal of electrical connector 27 set on combination part 3, so to accomplish electrical connection of the output means 4 integrated with computer main and the input means 2.

Figure 7:
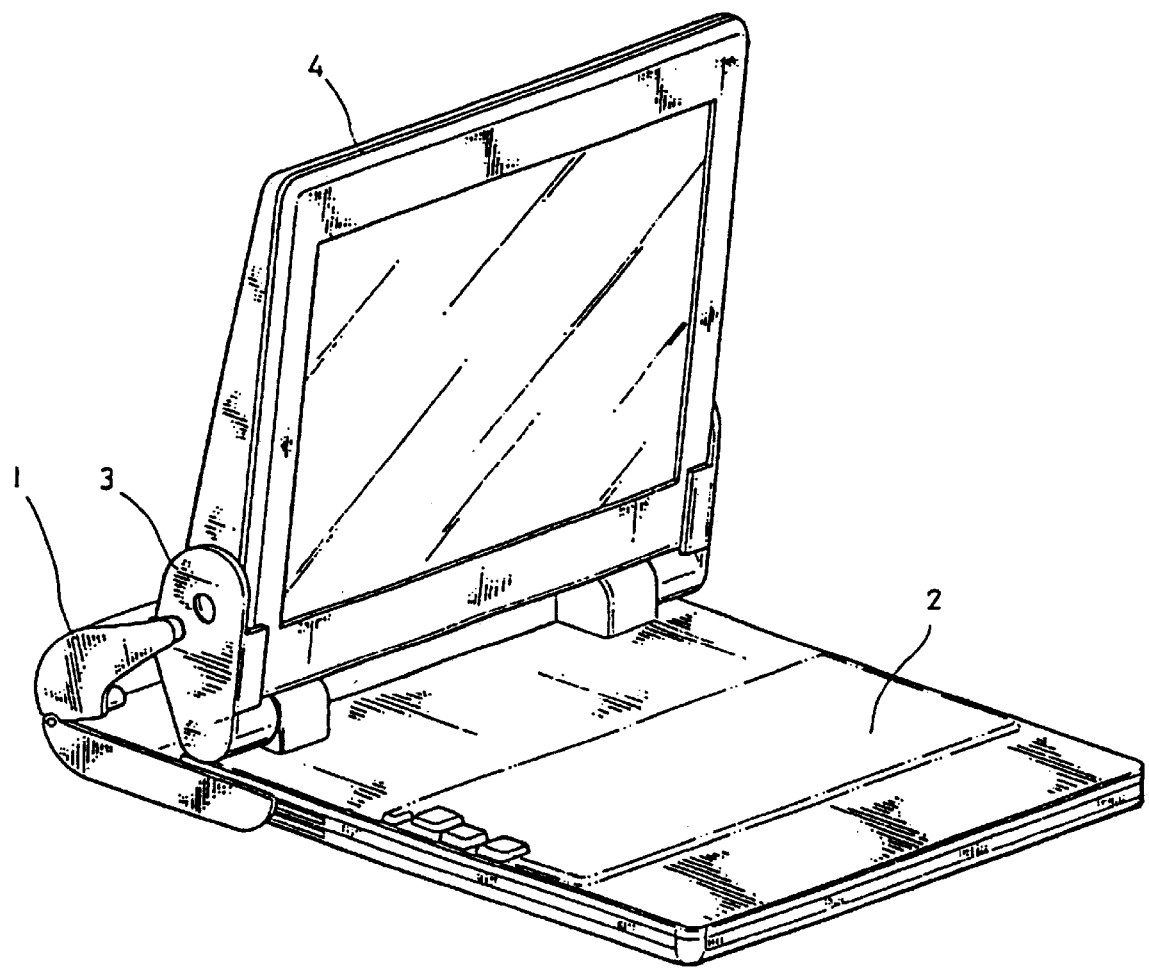
FIG. 7 is a schematic view of the embodiment of FIG. 1 in a state of usage.

Finally, it can be seen from FIG. 7 all the assembling relations between above members. When the output means 4 integrated with computer main is connected to combination part 3, the output means 4 integrated with computer main and input means 2 are also connected, and the input means 2 becomes the input keyboard of the output means 4 integrated with computer main, forming a set of microcomputer. Due to the fact that connecting part 1 can be slid to and fro on the input means 2 and combination part 3 can be turned over on the connecting part 1, the output means 4 integrated with computer main can also be slid and turned over on the input means 2. If necessary, the output means 4 integrated with computer main can be separated from combination part 3, and the output means 4 integrated with computer main, being separated from the input means, can be used independently.

Besides above preferred embodiment, other embodiments are also available for present invention. All equivalent substitutions or modifications will fall within the scope of patent protection of present invention.

What is claimed is:

1. A built-up microcomputer, comprising an input means (2) wherein said input means (2) comprises a main body (21) and an outer housing (22) on top of said main body (21), at said outer housing (22) corresponding to the combination part (3) are symmetrically provided with lugs (23), at the outer side of which is provided a cavity (24) symmetrically, and an output means (4) as well as a connecting part (1), wherein a first end of said connecting part (1) is hinged to the input means, and a second end of said connecting part is hinged on a combination part (3), and wherein said combination part (3) is joined to the independent output means (4) integrated with computer main, so that the output means (4) integrated with computer main is connected with the input means (2).

2. A built-up microcomputer as defined in claim 1, wherein a lower case (12) is provided with a sliding track (16) at both inner sides symmetrically corresponding to the main body (21) of the input means (2), and the main body (21) is provided with a mating sliding projection (26) corresponding to the sliding track (16).

3. A built-up microcomputer comprising an input means (2) having a front end and a back end, an output means (4) as well as a connecting part (1), wherein a first end of said connecting part (1) is hinged to the input means, and a second end of said connecting part is hinged on a combination part (3), wherein said combination part (3) is joined to the independent output means (4) integrated with computer main, so that the output means (4) integrated with computer main is connected with the input means (2), and wherein said connecting part (1) is composed respectively of an upper case (11) and a lower case (12) hinged with each other, said upper case (11) is provided with a hinge tube (13) each at both sides corresponding to the back end of the input means (2), and wherein said lower case (12) is provided with a hinge tube (14) to mate with the hinge tube (13) at the corresponding position of the hinge tube (13), in assembling, a pin (15) is inserted into the hinge tubes (13) and (14), so that the upper case (11) and lower case (12) are hinged together.

4. A built-up microcomputer as defined in claim 3, wherein said upper case (11) has a boss (17) provided at a position corresponding to an inner end on the other side of the hinge tube (13), said combination part (3) is provided with a through hole (32) symmetrically corresponding to the position of the boss (17), which is movably fitted in the through hole (32), so that the combination part (3) is hinged together with the connecting part (1).

5. A built-up microcomputer as defined in claim 3, wherein said lower case (12) is provided with a sliding track (16) at both inner sides symmetrically corresponding to a main body (21) of the input means (2), and the main body (21) is provided with a mating sliding projection (26) corresponding to the sliding track (16).

6. A built-up microcomputer, comprising an input means (2), an output means (4) as well as connecting part (1), wherein a first end of said connecting part (1) is hinged to the input means, and a second end of said connecting part (1) is hinged on a combination part (3), wherein said combination part (3) is joined to the independent output means (4) integrated with computer main, so that the output means (4) integrated with computer main is connected with the input means (2), wherein said combination part (3) is provided with a protruding tube (33) at both inner sides symmetrically corresponding to lugs (23) of the input means (2), and said protruding tube (33) is fitted into cavity (24) of lugs (23) so as to render the combination part (3) and the input means (2) hinged together.

7. A built-up microcomputer comprising an input means (2), an output means (4) as well as connecting part (1), wherein a first end of said connecting part (1) is hinged to the input means, and a second end is hinged on a combination part (3), wherein said combination part (3) is joined to the independent output means (4) integrated with computer main, so that the output means (4) integrated with computer main is connected with the input means (2), wherein said output means (4) is composed of a main body (42) and a display screen (43) connected together, and wherein said combination part (3) is provided with positioning bars (34) symmetrically at a position corresponding to a front of the display screen (43) of the output means (4) integrated with computer main, while inserting into the combination part (3), the output means (4) is slid into the combination part (3) under the guide of positioning bar (34).

8. A built-up microcomputer, comprising an input means (2), an output means (4) as well as connecting part (1), wherein a first end of said connecting part (1) is hinged to the input means, and a second end is hinged on a combination part (3), wherein said combination part (3) is joined to the independent output means (4) integrated with computer main, so that the output means (4) integrated with computer main is connected with the input means (2), wherein a snap fastener (35) has a cylindrical body (352), which is provided symmetrically with a shoulder (351) at the both sides corresponding to end of combination part (3), when said shoulders abut on a first through hole (31), the snap fastener (35) would be confined within the combination part (3), in the cavity of snap fastener (35) is provided a mobile embedding part (353), which is surrounded by an elastic element (354), on an other end of cylindrical body (352) relative to the shoulder (351) is provided a push button (355), at a position of the combination part corresponding to the mobile embedding part (353) is provided a pawl member (36), which has a plurality of pawls (361) at an end relative to snap fastener (35) for a catching mobile embedding part (353), when the output means (4) integrated with computer main is inserted in the combination part (3), pressing the button (355) can make the pawls (361) to release mobile embedding part (353), so that under spring action of an elastic element (354), the snap fastener (35) will push button (355) into a second through hole (44), making the output means (4) connected with combination part (3).

9. A built-up microcomputer comprising, comprising an input means (2), an output means (4) as well as connecting part (1), wherein a first end of said connecting part (1) is hinged to the input means, and a second end is hinged on a combination part (3), wherein said combination part (3) is joined to the independent output means (4) integrated with a computer main, so that the output means (4) integrated with the computer main is connected with the input means (2), wherein said connecting part (1) is composed respectively of an upper case (11) and a lower case (12) hinged with each other, and wherein said upper case (11) has a boss (17) provided at a position corresponding to an inner end on the other side of a hinge tube (13), said combination part (3) is provided with a through hole (32) symmetrically corresponding to the position of the boss (17), which is movably fitted in the through hole (32), so that the combination part (3) is hinged together with the connecting part (1).

* * * * *